United States Patent
Lashmet

(10) Patent No.: US 11,550,790 B2
(45) Date of Patent: *Jan. 10, 2023

(54) OBJECT RELATIONAL MAPPER FOR NON-RELATIONAL DATABASES

(71) Applicant: INTUIT INC., Mountain View, CA (US)

(72) Inventor: Jason Lashmet, Woodland Hills, CA (US)

(73) Assignee: INTUIT, INC., Mountain View, CA (US)

( * ) Notice: Subject to any disclaimer, the term of this patent is extended or adjusted under 35 U.S.C. 154(b) by 353 days.

This patent is subject to a terminal disclaimer.

(21) Appl. No.: 16/792,464

(22) Filed: Feb. 17, 2020

(65) Prior Publication Data

US 2020/0183939 A1 Jun. 11, 2020

Related U.S. Application Data

(63) Continuation of application No. 15/499,643, filed on Apr. 27, 2017, now Pat. No. 10,565,203.

(60) Provisional application No. 62/480,062, filed on Mar. 31, 2017.

(51) Int. Cl.
| | | |
|---|---|---|
| G06F 16/20 | (2019.01) | |
| G06F 16/2455 | (2019.01) | |
| G06F 16/21 | (2019.01) | |
| G06F 16/248 | (2019.01) | |
| G06F 16/22 | (2019.01) | |
| G06F 16/23 | (2019.01) | |

(52) U.S. Cl.
CPC ...... *G06F 16/24554* (2019.01); *G06F 16/212* (2019.01); *G06F 16/2282* (2019.01); *G06F 16/2379* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 5,379,419 | A * | 1/1995 | Heffernan | G06F 16/258 |
| 5,937,409 | A * | 8/1999 | Wetherbee | G06F 16/289 |
| 6,721,749 | B1 * | 4/2004 | Najm | G06F 16/254 |
| 7,552,130 | B2 * | 6/2009 | Cook | G06F 16/285 |
| | | | | 707/999.102 |
| 8,260,824 | B2 * | 9/2012 | Mao | G06F 16/288 |
| | | | | 707/756 |
| 2007/0282869 | A1 * | 12/2007 | Paulus | G06F 16/972 |

OTHER PUBLICATIONS

Github, impetus-opensource/Kundera. https://github.com/impetus-opensource/Kundera.
DataStax, Java Driver for Apache Cassandra. http://docs.datastax.com/en/developer/java-driver/2.1/manual/object_mapper/.
(Continued)

*Primary Examiner* — Belix M Ortiz Ditren
(74) *Attorney, Agent, or Firm* — Patterson & Sheridan, LLP

(57) ABSTRACT

This disclosure relates to increasing database functionality in non-relational databases using an object relational mapper to provide updates to table field values across a plurality of separate tables and provide virtual table functionality through compound search operations and condensed table structures.

20 Claims, 6 Drawing Sheets

(56) References Cited

OTHER PUBLICATIONS

Github, doanduyhai/Achilles. https://github.com/doanduyhai/Achilles.
Hibernate OGM. http://hibernate.org/ogm/.
DataStax, CQL for Apache Cassandra 2.0 & 2.1. https://docs.datastax.com/en/cql/3.1/cql/cql_using/useBatch.html.
Datastax, CQL for Apache Cassandra 3.0. https://docs.datastax.com/en/cql/3.3/cql/cql_using/useBatch.html.

* cited by examiner

OBJECT RELATIONAL MAPPER FOR NON-RELATIONAL DATABASES

CROSS REFERENCE TO RELATED APPLICATIONS

This Application is a continuation of and hereby claims priority under 35 U.S.C. § 120 to pending U.S. patent application Ser. No. 15/499,643, filed on Apr. 27, 2017, which claims the benefit of U.S. Provisional Application No. 62/480,062, filed on Mar. 31, 2017, the contents of each of which are incorporated herein in their entirety.

BACKGROUND

Field

Aspects of the present disclosure generally relate to non-relational databases, and more specifically to processing data queries based on object relationships in non-relational databases.

Description of the Related Art

Databases are generally used to store data used by various types of applications. These databases may be relational databases or non-relational databases. In relational databases, data is generally organized based on relationships in the database. A relational database may have a plurality of tables, with each table storing data related to a single entity or construct. Each table may be populated by a plurality of records, and each record may be associated with an identifier (e.g., a primary key). Relationships between records in the database may be represented, for example, by the presence of a primary key from a first record as a foreign key in a second record. In some cases, to access data from a database, a developer can write a plurality of code modules for accessing data from the database, with each code module providing access to a specific table in the relational database.

In some cases, the use of non-relational databases to store and retrieve data may allow for more rapid data access and more scalable data storage relative to relational database systems. These non-relational databases need not store data using a table construct; non-relational databases may instead store data, for example, as large data sets of key-value pairs, graphs, n-tuple stores, and the like. Unlike relational databases, where each construct to be stored in a database is generally stored in a single table, data in a non-relational database may be denormalized into a plurality of tables, with each table containing a copy of the data associated with different sets of data defined as indices for the tables.

SUMMARY

One embodiment of the present disclosure includes a method for using object-relational mappings for data in non-relational databases. The method includes receiving, at an object relational mapper, a request to update a field in a non-relational database with a value. The method also includes parsing a schema for a plurality of database tables to identify one or more tables that include the field. The method includes generating a database command for each identified database table, where the database command writes the value to the field. The method also includes sending each database command to the identified database table.

Another embodiment provides a computer-readable storage medium having instructions, which, when executed on a processor, operates to detect and source software defects. The operation includes receiving, at an object relational mapper, a request to update a field in a non-relational database with a value. The operation also includes parsing a schema for a plurality of database tables to identify one or more tables that include the field. The operation includes generating a database command for each identified database table, where the database command writes the value to the field. The operation also includes sending each database command to the identified database table.

Still another embodiment of the present invention includes a processor and a memory storing a program, which, when executed on the processor, performs an operation for detecting and sourcing software defects. The operation includes receiving, at an object relational mapper, a request to update a field in a non-relational database with a value. The operation also includes parsing a schema for a plurality of database tables to identify one or more tables that include the field. The operation includes generating a database command for each identified database table, where the database command writes the value to the field. The operation also includes sending each database command to the identified database table.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Object-relational mapping generally allows users to interact with databases (e.g., write data to and read data from relational or non-relational databases). In some cases, object-relational mappings may entail the generation of a plurality of classes for interacting with a database, with each of the plurality of classes representing interactions with a particular table in the database. Because relational databases generally involve a tabular paradigm with each construct being stored in an individual table, object-relational mappings for a relational database may entail the generation of a single code module for each construct stored in the database. However, because non-relational databases generally include denormalized data duplicated across a plurality of tables, object-relational mappings in a non-relational database may entail the generation of multiple classes for each construct (e.g., to search for data using different sets of key values).

Aspects of the present disclosure discuss methods for generating and using object-relational mappers in non-relational databases that take advantage of the use of various sets of key data to search for data across a plurality of tables in a non-relational database. Instead of generating a plurality of classes for accessing data according to the definitions of different tables with duplicated data, aspects of the present disclosure generally allow for the generation of a single data class to search for data using one of a plurality of key data set permutations. In some cases, aspects of the present disclosure further allow for the use of key data and non-key-data to search for data in a non-relational database.

Figure 1:
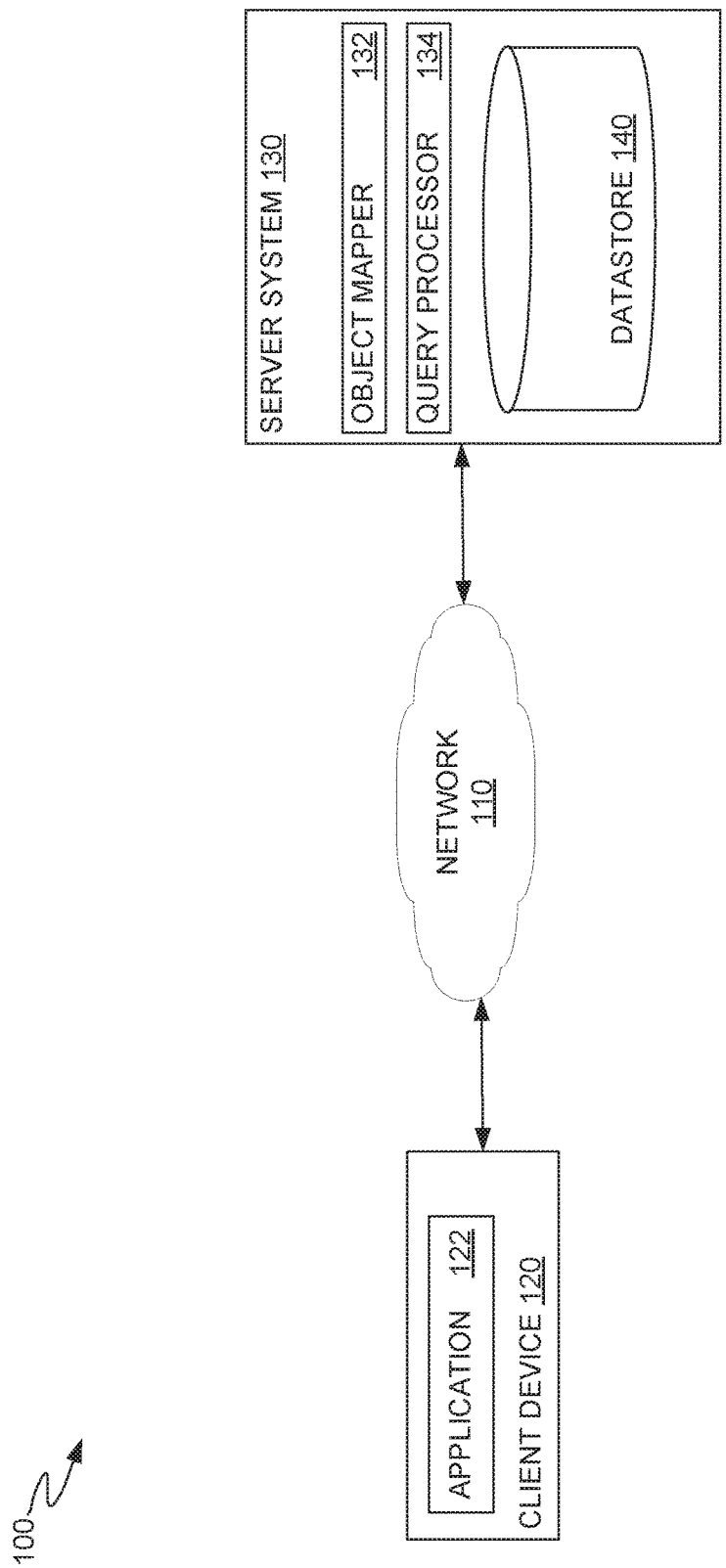
FIG. 1 illustrates an example networked computing environment, according to one embodiment.

FIG. 1 illustrates an example query processing system, according to an embodiment. As illustrated, a client device 120 and server system 130 are connected via network 110.

Client device 120 generally includes one or more applications 122 executing on the client device. These applications 122 may receive user input specifying data a user of client device 120 wishes to view. Based on the user input, the applications 122 can generate one or more queries to be processed by server system 130, as described in further detail herein. Applications 122 may receive a data set from server system 130 in response to the generated one or more queries and may display the data set to the user. Applications 122 may additionally receive input specifying data to be written to a database (e.g., data store 140 at server system 130) and generate one or more queries to perform data write and/or modification operations at server system 130.

Server system 130 generally receives queries from client device 120 and responds by returning a result data set (in the case of read queries against a data store) or by writing or modifying data in a data store (in the case of write or update queries against the data store). As illustrated, server system 130 generally includes an object mapper 132, query processor 134, and data store 140.

Object mapper 132 generally uses the definition of a plurality of related tables to generate an object relational mapping (e.g., including a set of rules for processing queries) for the plurality of related tables. The plurality of related tables may be, in some cases, a plurality of tables in which the same data is replicated and for which different sets of key values are defined. For example, in a customer tracking database implemented using a non-relational model, a plurality of tables may include customer identity data. A first table may define customer given name as a key, a second table may define customer last name as a key, and so on. Each of the plurality of tables may include the same data or related data. In another example, in a transaction tracking database using a non-relational model, a first table may include basic transaction data (e.g., customer identifier, transaction identifier, and transaction date), and a second table may include more data for which the 3-tuple of {customer identifier, transaction identifier, transaction date} serves as the primary key.

To generate a single code module for processing queries against the plurality of related tables, object mapper 132 may examine the data stored in each of the plurality of related tables to map domain objects to the non-relational database. In some cases, each field in a database may be associated with a persistence strategy that defines how object mapper 132 generates the object relational mapping and how object mapper 132 generates code for writing data to the plurality of related tables. The persistence strategies may include indications that a field should be persisted into a database field with the same name, not persisted, appended to a database, serialized and persisted to a text field in a specific table or a related table, denormalized before persistence (e.g., having redundant copies of the data persisted to a plurality of tables in the non-relational database), or persisted into a map rather than an individual table column. To write data to the table, object mapper 132 can generate commands that allow for the use of batch write processes to improve the efficiency of database write processes. In some cases, the code for performing batch write processes may sort write requests from a user-submitted batch by the machine or partition that will process the request. A user-submitted batch of write processes are grouped into sub-batches directed to specific machines or partitions. In some cases, the sub-batches may be generated based on a partition key, i.e., a unique row identifier, from each write request, as the same server or partition will process the same partition key. In some cases, batches of write processes may be ordered based on an identity of a destination server for a write request obtained, for example, from a driver that manages inter-server communication in the distributed system. Multiple partition keys may be mapped together when the partition keys happen to map to the same server or partition. In some cases, requests may be grouped into sub-batches automatically, without user input.

The single code module generated by object mapper 132 may define how data is to be written to the plurality of tables in the database and identify a plurality of methods by which users can search for data in the database. The definition of how data is written to the database may be defined by the persistence strategies described above. To create the commands that allow for the use of a single code module to perform read operations against the plurality of related tables, object mapper 132 can examine the primary key definitions for each of the plurality of related tables to generate and expose, to one or more client applications, read functionality for the plurality of related tables. Using the customer tracking database described above, some of the functions generated by object mapper 132 may include a first function for searching for customer data by customer given name, a second function for searching for customer data by customer last name, and the like. In another example, some functions may be generated to allow a user to retrieve data from a large data set by searching for a primary key in a smaller data set. For example, using the transaction tracking database described above, a function generated by object mapper 132 may include a first function for searching for transaction information by a transaction identifier. The first function may return the three-tuple of {customer identifier, transaction identifier, transaction date} used as a primary key for a larger data set. In some cases, the first function may invoke a second function for searching for transactions in the larger data set, which may result in the user receiving transaction details from the larger data set by searching for data in a smaller data set.

In some cases, as described in further detail below, object mapper 132 can further generate and process queries based on determining whether the parameters of a query provided to server system 130 are key data (e.g., primary keys defined for at least one table in the plurality of related tables) or not key data (e.g., other data defined in a table that is not used, in whole or in part, to uniquely identify an entry in a table). The commands generated by object mapper 132 can parse out key data and non-key data, generate queries using the identified key data, and filter the results of a query using the non-key data to generate a final data set to return to a user.

Query processor 134 generally uses the commands generated by object mapper 132 to generate and execute queries against data store 140, according to an embodiment. As discussed above, query processor 134 may receive a query from an application 122 executing on client device 120 specifying a plurality of search parameters. Query processor 134 may divide the query into key data and non-key data by identifying the fields for which search parameters were included and comparing the identified fields to the fields specified as primary keys for each of the plurality of related tables. The search parameters specified as primary keys for each of the plurality of related tables may be used to generate a query for execution, while the search parameters specified as non-key data may be retained in memory for use in filtering the search results returned by the generated query, as discussed in further detail below.

To identify a table against which query processor 134 executes a query, query processor can compare the number of provided primary keys against the number of specified primary keys for each table. Query processor 134 can choose to execute queries against the table for which the highest percentage of primary keys have been provided. For example, using the customer tracking database example described above, presume that a user has generated a query specifying that the user wishes to obtain data for all customers with the last name of "Smith" and does not provide a specific given name. Query processor 134 can determine that the query should be executed against a customer data table for which last name is defined as a primary key, as 100 percent of the specified key fields have been provided in the query, and not executed against a customer data table for which first name is defined as a primary key, as 0 percent of the specified key fields have been provided in the query.

Upon receiving a data set from executing the query against the selected table, query processor 134 applies one or more filters, if any, to the data set. These filters may be defined as the search parameters provided to query processor 134 that were identified as non-key data for any of the plurality of related tables. As the data set is generally defined as a set of n-tuples with a specified order, query processor 134 can identify the position of data in each n-tuple associated with a given filer. Query processor 134 generally compares the data in each n-tuple associated with a given filer to the non-key data parameters to determine whether each n-tuple should be returned as a result of the search.

Using the customer tracking database as an example, suppose that the search parameters include a specific customer last name, a lower age bound, and an upper age bound. Because age may not be defined as a primary key in any of the customer database tables, query processor 134 can execute a query against the customer database table for which customer last name is defined as a primary key to obtain a data set of all customers with the specified last name. Query processor 134 may examine each entry in the data set to determine whether the customer represented by each entry meets the age parameters specified in the search (i.e., whether the customer represented by each entry is between the ages specified by the lower age bound and upper age bound, inclusive). If the customer represented by an entry meets the specified age parameters, the entry may be retained in the data set; otherwise, the entry may be discarded from the data set.

Data store 140 generally includes a plurality of tables that store data for user interaction, as discussed above. These tables may be part of a non-relational database in which multiple copies of the same data are maintained in different database tables, with each table having a different set of primary keys that can be used to search for data. As discussed above, object mapper 132 can use the definitions of related tables in data store 140 to automatically generate queries for writing data to and reading data from a plurality of related tables. The commands generated by object mapper 132 for querying data from the plurality of related tables in data store 140 may be used by query processor 134 to obtain data from data store 140 based on key data identified in search parameters before filtering the obtained data according to non-key data parameters.

Figure 2:
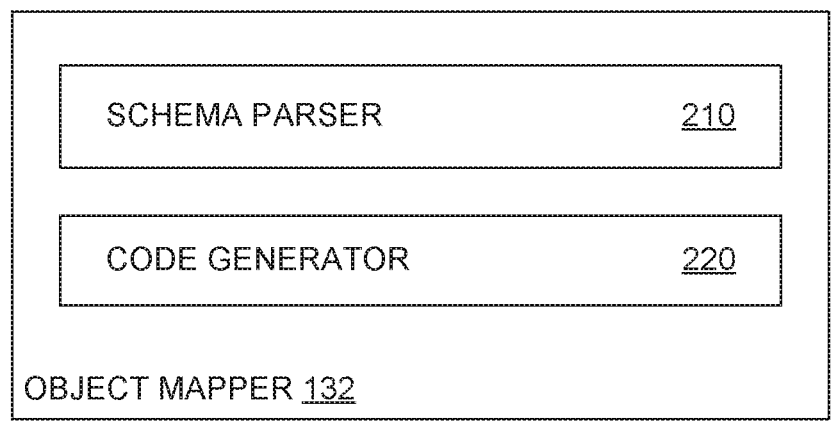
FIG. 2 illustrates an example object mapper for mapping objects in non-relational databases, according to one embodiment.

FIG. 2 illustrates an example object mapper 132, according to an embodiment. As illustrated, object mapper 132 generally includes a schema parser 210 and a code generator 220.

Schema parser 210 is generally configured to examine the schemas associated with each of a plurality of related tables to identify a persistence strategy and key data for each table. As discussed above, each field in a database may be associated with a persistence strategy that defines how object mapper 132 generates the object relational mapping. The persistence strategies may include indications that a field should be persisted into a database field with the same name, not persisted, appended to a database, serialized and persisted to a text field in a specific table or a related table, denormalized before persistence (e.g., having redundant copies of the data persisted to a plurality of tables in the non-relational database), or persisted into a map rather than an individual table column. Schema parser 210 can provide the persistence strategy and the associated field to code generator 220 to generate commands for executing write queries against the plurality of related data tables, as discussed in further detail below.

Schema parser 210 additionally examines the key data identified for each of the plurality of tables to identify a plurality of methods for searching for data stored in the plurality of tables. As discussed above, in a non-relational database, the same data may be stored in a plurality of tables and indexed using different groups of key data. For example, in a customer tracking database, multiple tables may exist with the same customer data. A first table may use customer given name as a primary key, a second table may use customer last name as a primary key, a third table may use the 2-tuple of {customer given name, customer last name} as a primary key, and the like. For each table, schema parser 210 can identify key data fields and non-key data fields and provide the data about key data fields and non-key data fields to code generator 220 to generate read functions for each of the plurality of tables.

Code generator 220 generally uses the information about a persistence strategy for each field in the plurality of tables identified by schema parser 210 to generate commands for executing queries against one or more tables of the plurality of related tables. As discussed above, code generator 220 can use the persistence strategy for each field identified in the plurality of related tables to generate commands that write data to the plurality of related tables. When a write query is executed against one or more tables using the command generated by code generator 220, the command writes data to one or more related tables according to a persistence strategy that allows the data to be written and replicated across the plurality of related tables and need not write data to one or more related tables for fields for which code generator 220 generated commands that ignores those fields.

Code generator 220 additionally uses the information about key data and non-key data identified for each table in the plurality of tables to generate one or more functions for reading data from the plurality of tables in the non-relational database. In some cases, code generator 220 can generate a dispatcher function to be exposed to users of server system 130 that receives search parameters from a user and parses the search parameters to identify the key data fields identified in the search parameters. Based on the number of matches between key data fields identified in the search parameters and key data fields defined for each of the plurality of tables, the dispatcher function can generate a query against one of the plurality of tables to obtain the requested data from data store 140. In some cases, code generator 220 can generate a dispatcher function that generates a query against the table for which the highest percentage of key data values have been specified in the search parameters.

Code generator 220 may additionally generate one or more functions for filtering a data set based on non-key data parameters specified in a query. In some cases, as discussed above, data set filtering may be performed after a query is executed against one of the plurality of tables in a non-relational database to obtain a data set matching the key data parameters provided in a search request. In some cases, where search parameters do not include non-key data parameters, the dispatcher function need not invoke any of the functions for data set filtering and may return the results of the query to a user. Otherwise, the dispatcher function may invoke one or more data set filtering functions and return the set of filtered data to a user, as discussed in further detail below.

Figure 3:
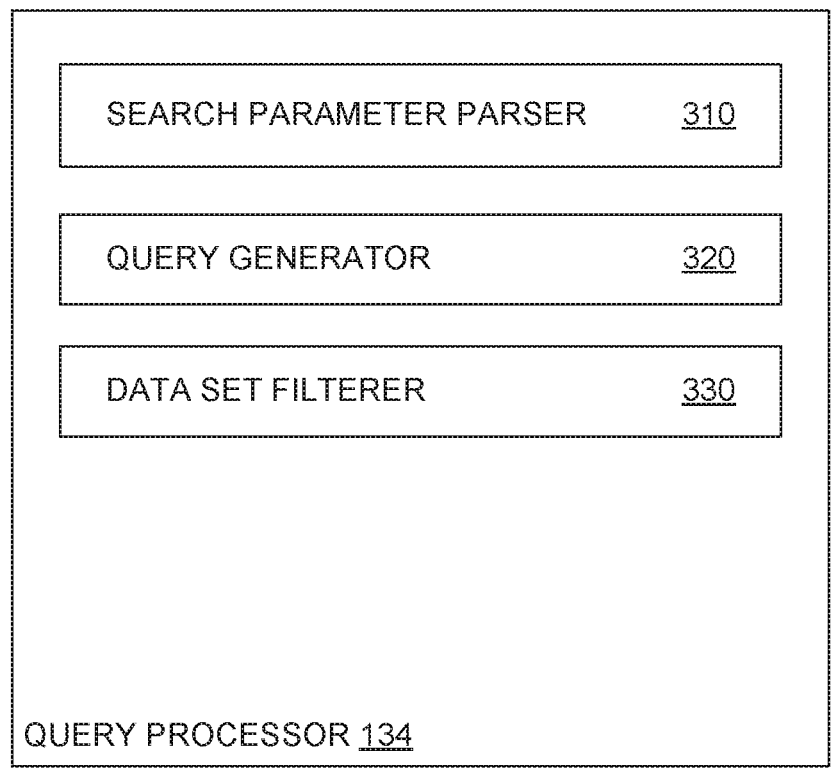
FIG. 3 illustrates an example query processor for processing queries against a plurality of tables in a non-relational database, according to one embodiment.

FIG. 3 illustrates an example query processor 134, according to an embodiment. As illustrated, query processor 134 generally includes a search parameter parser 310, a query generator 320, and a data set filter 330.

Search parameter parser 310 generally receives a search request from application 122 including a plurality of search parameters. These search parameters may include key data parameters and non-key data parameters defined for at least one of the plurality of related tables in a non-relational database. Using the customer tracking database described above, the received search request may include parameters for one or more of customer given name or customer last name—fields defined as key data in one or more of the plurality of related tables in the database—and one or more parameters for non-key data in the plurality of related tables. To partition a search request into key data parameters and non-key data parameters, search parameter parser can search the schemas associated with each of the plurality of related tables to determine if a parameter corresponds to a key data field defined for at least one of the plurality of related tables or a non-key data field. Search parameter parser 310 may pass the parameters corresponding to key data fields in at least one of the plurality of related tables to query generator 320 and store the parameters corresponding to non-key data fields in memory to be used by data set filterer 330, as discussed in further detail below.

Query generator 320 generally receives parameters correspond to key data in one or more of a plurality of related tables to generate and execute queries for data from one of the plurality of related tables. To determine which table of the plurality of related tables to generate queries against, query generator 320 can examine the schemas for each of the plurality of related tables to identify candidate tables against which a query may be processed. A candidate table may include one or more fields corresponding to key data parameters provided to query processor 134 from a user. Of the candidate tables identified by query generator, query generator may, in some cases, choose to execute a query against a table for which the highest proportion of key data fields have been provided in the search request. Using the customer tracking database as an example, presume that a user has generated a query specifying that the user wishes to obtain data for all customers with the last name of "Smith" and does not provide a specific given name. Query processor 134 can determine that the query should be executed against a customer data table for which last name is defined as a primary key, as 100 percent of the specified key fields have been provided in the query, and not executed against a customer data table for which first name is defined as a primary key, as 0 percent of the specified key fields have been provided in the query. After determining which database to query based on the provided key data parameters in the search request, query generator 320 generates a query, transmits the query to the database for processing, and receives a data set in response to the query.

Data set filterer 330 is generally configured to examine a data set returned from a database in response to a query generated by query generator 320 and filter the returned data set according to non-key data parameters provided to query processor 134 in a search request. As discussed above, the data set returned from execution of a query against one or more tables in data store 140 may be represented as a number of n-tuples, with each n-tuple including the set of data defined by a schema for the database from which the data was obtained. Data set filterer 330 can use the non-key data parameters provided in a search request and stored in memory to determine whether items in the data set should be returned as a result of the search request or removed from the data set. For example, using the customer tracking table discussed above as an example, suppose that the search parameters include a specific customer last name, a lower age bound, and an upper age bound. Because age may not be defined as a primary key in any of the customer database tables, data set filterer 330 may receive, from search parameter parser 310, the lower age bound and upper age bound parameters to apply to the results of a query for customer data. After query generator 320 receives a data set representing the results of a query from one or more tables in the database, data set filterer 330 may examine each entry in the data set to determine whether the customer represented by each entry meets the age parameters specified in the search (i.e., whether the customer represented by each entry is between the ages specified by the lower age bound and upper age bound, inclusive). If the customer represented by an entry meets the specified age parameters, the entry may be retained in the data set; otherwise, the entry may be discarded from the data set. Data set filterer 330 may return the filtered data set to application 122 as the results of the search request generated by the application.

Figure 4:
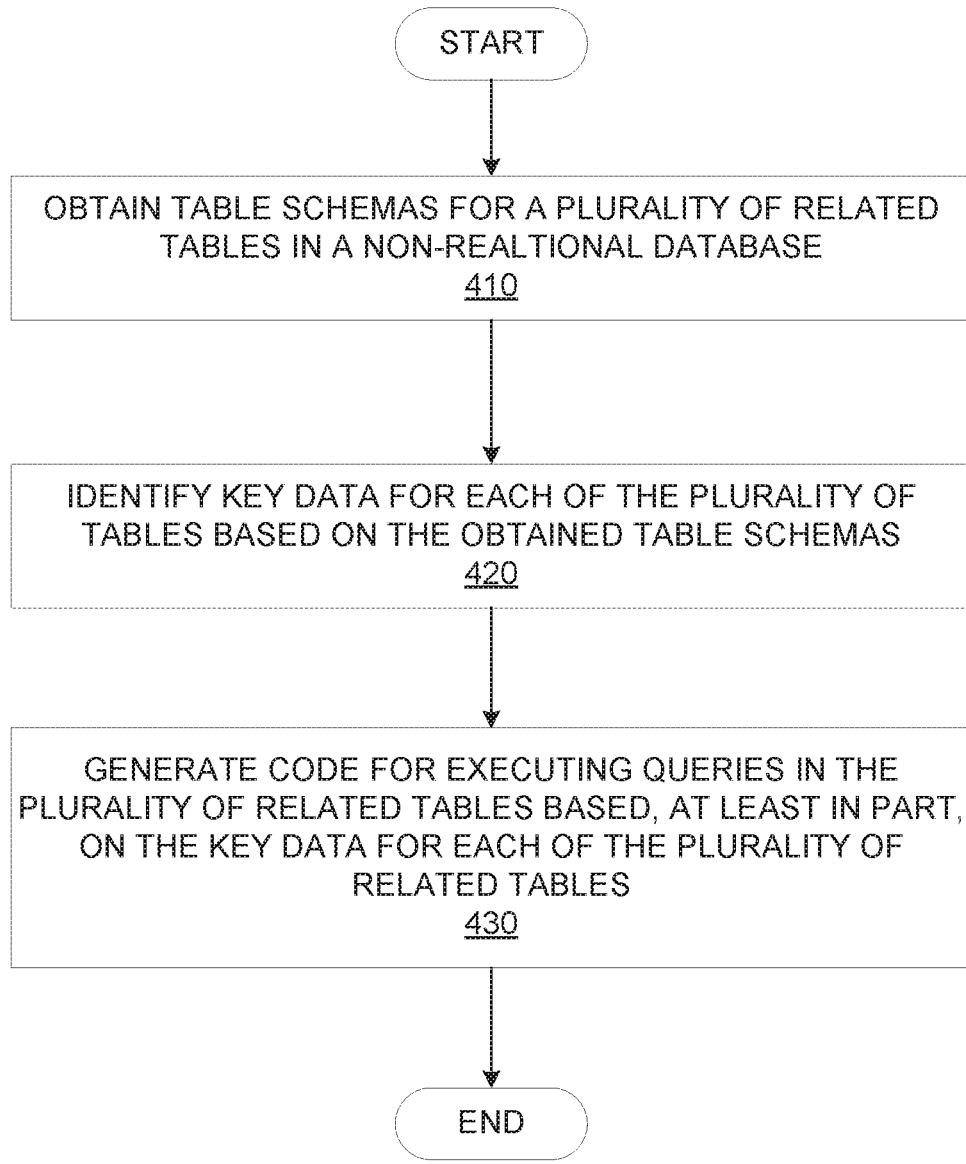
FIG. 4 illustrates example operations that may be performed by an object mapper to generate and processing queries against a plurality of related tables, according to one embodiment.

FIG. 4 illustrates example operations for generating an object relational mapping for a plurality of related tables in a non-relational database, according to an embodiment. As illustrated, operations 400 begin at step 410, where object mapper 132 obtains table schemas for a plurality of related tables in a non-relational database for analysis. As discussed above, the table schemas for each of the plurality of related tables in the non-relational database may include information about the data stored in each database table and the key data used to identify records in each table of the plurality of related tables.

At step 420, object mapper 132 can identify key data defined for each of the plurality of tables. The identified key data may include one or more fields in each table and may specify, in some cases, whether the key data fields may be used individually to generate queries against data in the database tables or as an n-tuple of data parameters which are to be specified in a query.

At step 430, object mapper 132 generates code for executing queries against the plurality of related tables based, at least in part, on the key data defined for each of the plurality of related tables. In some cases, as discussed above, object mapper 132 may generate a dispatcher function that receives search requests from an application 122 and a plurality of table-specific functions that the dispatcher function can use to dispatch queries to the appropriate table based on the key data parameters provided in a query. For example, using the customer tracking database discussed above as an example, object mapper 132 can generate a first query for searching for customers by given name, a second query for searching for customers by last name, a third query for searching for customers by given name and last name, and the like.

In some cases, object mapper 132 may additionally generate commands for writing data to the plurality of related tables based on properties of each data field in the plurality of related tables. The persistence strategies may include indications that a field should be persisted into a database field with the same name, not persisted, appended to a database, serialized and persisted to a text field in a specific table or a related table, denormalized before persistence (e.g., having redundant copies of the data persisted to a plurality of tables in the non-relational database), or persisted into a map rather than an individual table column. To write data to the table, object mapper 132 can generate commands that allow for the use of batch write processes to improve the efficiency of database write processes.

Figure 5:
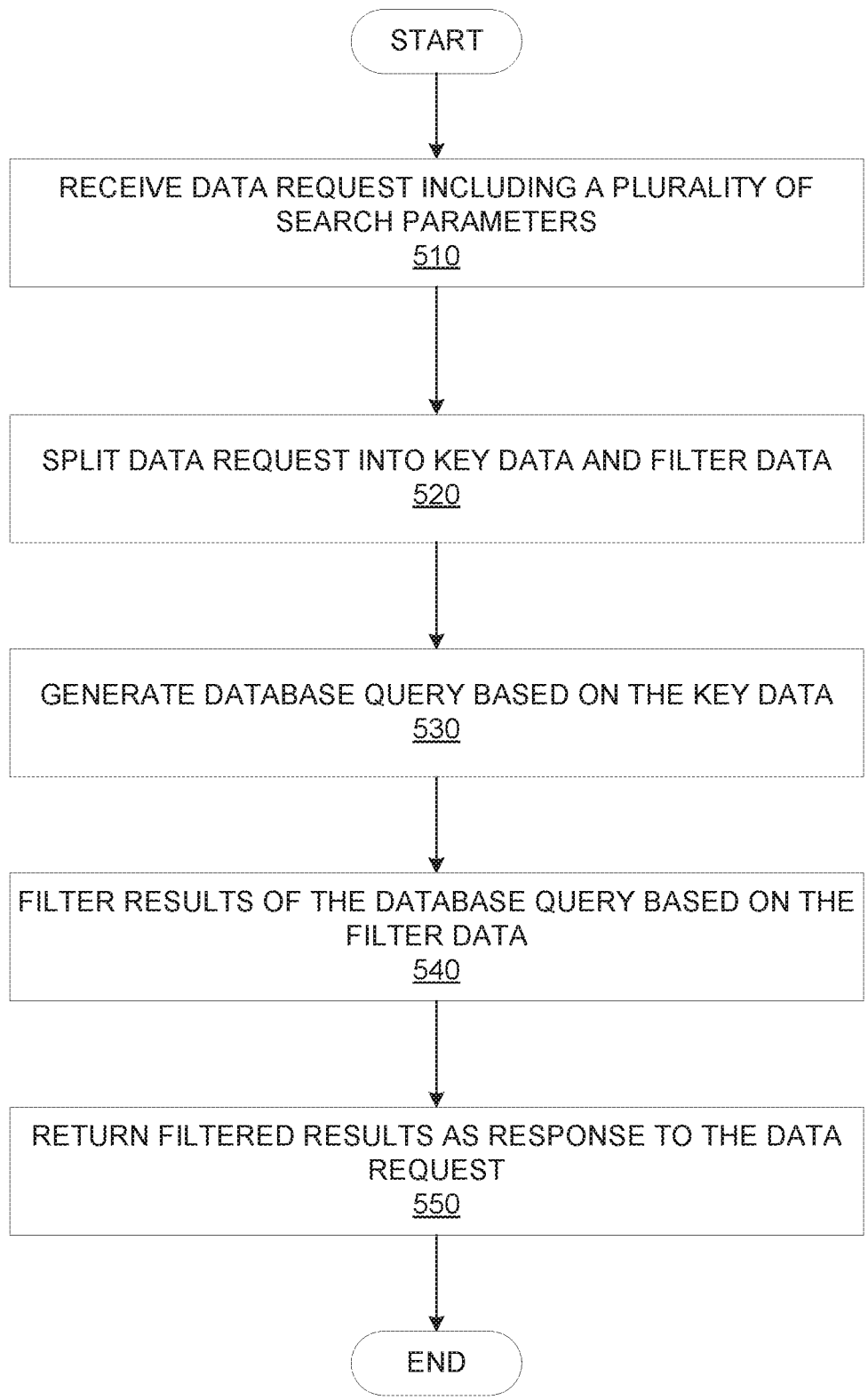
FIG. 5 illustrates example operations that may be performed by a query processor to process queries against a plurality of related tables, according to one embodiment.

FIG. 5 illustrates example operations for processing queries based on an object relational mapping for a plurality of related tables in a non-relational database, according to an embodiment. As illustrated, operations 500 begin at step 510, where query processor 134 receives a search request from an application including a plurality of search parameters. The search request may be received, for example, as a RESTful request, a graph query, and the like.

At step 520, query processor 134 splits the data request into key data and filter (non-key) data. Key data may include parameters which are identified as primary keys in at least one table of the plurality of related tables. Filter data may include parameters in a received search request that are not identified as primary keys in the plurality of related tables. In some cases, query processor 134 may provide the parameters identified as primary keys in at least one table of the plurality of related tables to a query processor and store the parameters identified as filters in memory for use in further processing a data set received from querying a table of the plurality of related tables.

At step 530, query processor 134 generates a database query based on the key data. As discussed above, query processor 134 can use the identified key data parameters to determine which table to generate a query against. For example, query processor 134 can examine the schemas for each of the plurality of related tables to identify candidate tables against which a query may be processed. Each candidate table may include one or more fields corresponding to key data parameters provided to query processor 134 from a user. Of the candidate tables identified by query generator, query generator may, in some cases, choose to execute a query against a table for which the highest proportion of key data fields have been provided in the search request. Query processor 134 may execute the query against the selected table and receive a data set in response to the query.

At step 540, query processor 134 filters the results of the database query based on the filter (non-key) data identified at step 520. In some cases, the data set returned from execution of a query against one or more tables in data store 140 may be represented as a number of n-tuples, with each n-tuple including the set of data defined by a schema for the database from which the data was obtained. Data set falterer 330 can use the non-key data parameters provided in a search request and stored in memory to determine whether items in the data set should be returned as a result of the search request or removed from the data set.

Figure 6:
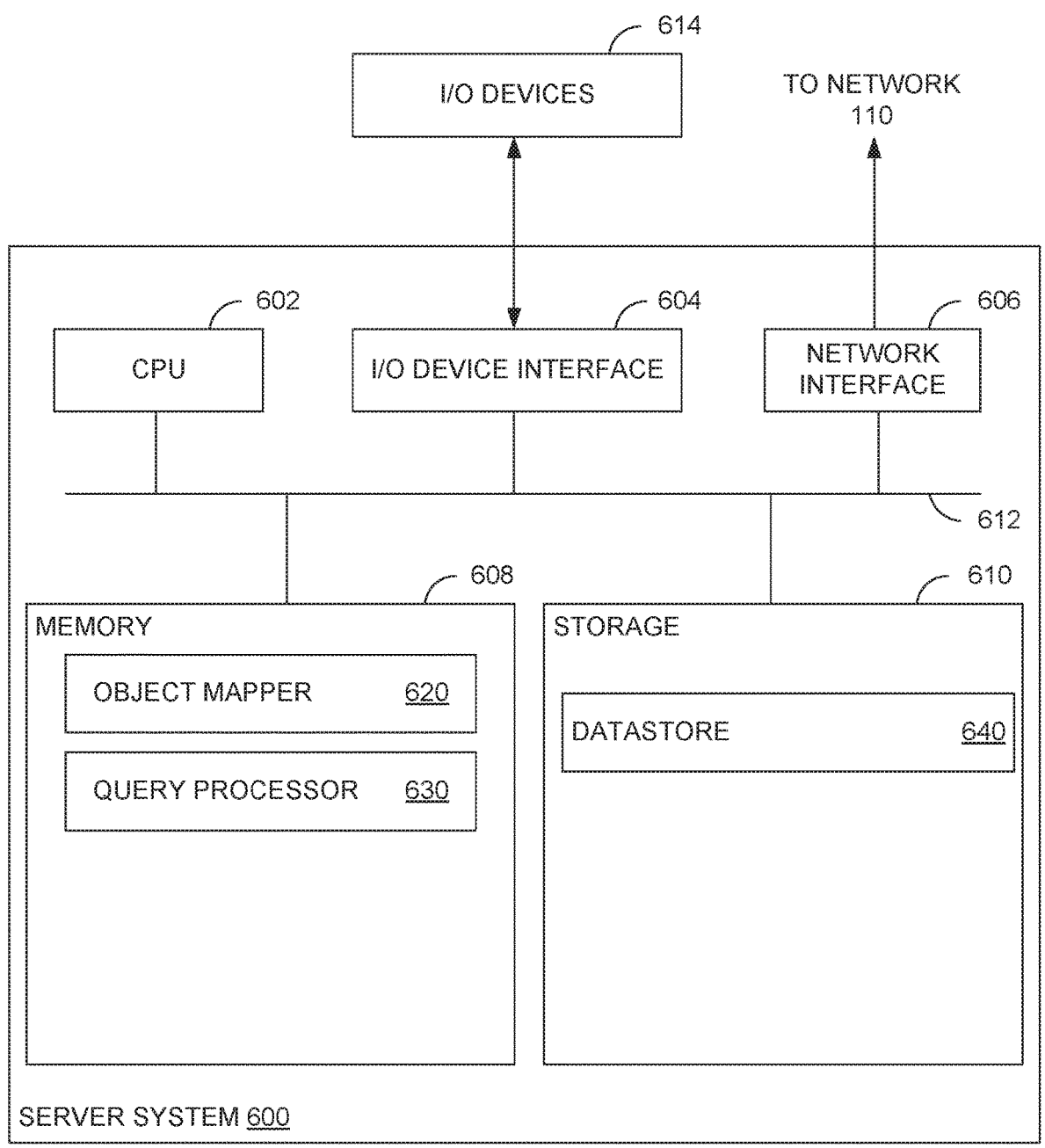
FIG. 6 illustrates an example system for mapping objects in non-relational databases and processing queries against a plurality of tables in non-relational databases, according to one embodiment.

FIG. 6 illustrates a system 600 that generates immersive media visualizations of a data set, according to an embodiment. As shown, the system 600 includes, without limitation, a central processing unit (CPU) 602, one or more I/O device interfaces 604 which may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an object mapper 620 and a query processor 630. Object mapper 620, as discussed above, generally uses the definition of a plurality of related tables (e.g., tables in data store 640 stored in storage 610) to generate an object relational mapping (e.g., including a set of rules for processing queries) for the plurality of related tables. In some cases, object mapper 62 may generate a single code module for writing data to and reading from the plurality of related tables. As discussed above, the plurality of related tables may include, for example, a plurality of tables in which the same data is replicated and for which different sets of key values are defined, or a plurality of tables where at least one table includes a large data set and at least one table includes a subset of the large data set.

The single code module generated by object mapper 620 may, in some cases, define how data is denormalized across the plurality of related tables. Further, in some cases, the code module generated by object mapper 620 may include one or more functions for performing batch writes of a data set to one or more tables in the plurality of related tables. To provide data searching functionality, the code module generated by object mapper 620 may include a dispatcher function and a plurality of data query functions. The dispatcher function generally receives search parameters from a user and parses the search parameters to identify the key data fields identified in the search parameters. Based on the number of matches between key data fields identified in the search parameters and key data fields defined for each of the plurality of tables, the dispatcher function can generate a query against one of the plurality of tables to obtain the requested data from at least one table of the plurality of related tables.

Query processor 630 generally receives search requests from an application 122 including a plurality of search parameters. Because some of the search parameters may not be identified as key data in the plurality of related tables, query processor 630 is generally configured to parse a received search request into key data and filter (non-key) data. The key data may be used to generate and execute a query against at least one table of the plurality of related tables, and the filter data may be used to determine whether elements of a data set returned from executing the query should be returned to application 122 as a result of the search request.

As shown, storage 610 includes a data store 640. Data store 640 may, in some cases, be a non-relational database including a plurality of related tables. As discussed herein, the plurality of related tables may include tables in which data is duplicated and for which different groups of primary keys are defined to allow a user to search for data in the plurality of related tables. Schema definitions for each of the plurality of related tables may be used by object mapper 620 to generate a code module for performing queries against the plurality of related tables (e.g., to write data to and read data from the plurality of related tables).

Advantageously, the use of an object-relational model to generate and process database commands allows for improved functionality in a non-relational database system. A single code base may be generated for querying (writing data to and reading data from) a plurality of related tables, which may reduce an amount of code that needs to be tested and debugged. Further, by separating search parameters in a search request into key data and filter data, the object-relational model described herein allows for database queries to be performed in non-relational databases regardless of whether the search parameters are defined as keys in at least one of the plurality of related tables.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for using object-relational mappings for data in non-relational databases comprising:
   receiving, at an object relational mapper, a database query from a user, wherein the database query includes a plurality of search parameters;
   parsing a schema for a plurality of database tables to identify a key table with a primary key matching the plurality of search parameters;
   querying the key table using the plurality of search parameters;
   receiving a primary key result list from the key table, wherein the primary key result list includes primary key values for a second table;
   querying against the second table using the primary key result list received from the key table;
   receiving a record result list from the second table; and
   providing the record result list to the user.

2. The method of claim 1, further comprising:
   receiving, at the object relational mapper, a group of database queries from the user, wherein each database query of the group of database queries includes a partition identifier;
   sorting the database queries in the group of database queries into a plurality of batches; wherein the database queries in each batch include a same partition identifier; and for each batch of queries, sending the batch of queries to a partition matching the partition identifier.

3. The method of claim 2, wherein the partition identifier includes a partition key.

4. The method of claim 2, wherein the partition identifier is received from a server communication driver.

5. The method of claim 1, further comprising:
receiving, at the object relational mapper, an additional database query from the user, wherein the additional database query includes an additional plurality of search parameters;
parsing the schema for the plurality of database tables to identify a table with a respective primary key including a highest number of search fields;
executing a given query in the table using search parameters of the additional plurality of search parameters matching the respective primary key;
receiving a result list from the table;
filtering the result list using the search parameters of the additional plurality of search parameters not matching the respective primary key of the table to produce a filtered result list; and
providing the filtered result list to the user.

6. The method of claim 5, further comprising:
receiving, at the object relational mapper, a second database query including a second search parameter from the user;
generating a second result list by filtering the filtered result list using the second search parameter; and
providing the second result list to the user.

7. The method of claim 1, further comprising:
receiving, at the object relational mapper, a request to update a field in a non-relational database with a value;
parsing the schema for the plurality of database tables to identify one or more tables that include the field; and
generating a database command for each identified database table, wherein the database command writes the value to the field; and
sending each database command to the identified database table.

8. A system, comprising:
one or more processors; and
memory storing instructions that, when executed on the one or more processors, cause the system to perform an operation for using object-relational mappings for data in non-relational databases, the operation comprising:
receiving, at an object relational mapper, a database query from a user, wherein the database query includes a plurality of search parameters;
parsing a schema for a plurality of database tables to identify a key table with a primary key matching the plurality of search parameters;
querying the key table using the plurality of search parameters;
receiving a primary key result list from the key table, wherein the primary key result list includes primary key values for a second table;
querying against the second table using the primary key result list received from the key table;
receiving a record result list from the second table; and
providing the record result list to the user.

9. The system of claim 8, wherein the operation further comprises:
receiving, at the object relational mapper, a group of database queries from the user, wherein each database query includes a partition identifier;
sorting the database queries in the group of database queries into a plurality of batches; wherein the database queries in each batch include a same partition identifier; and
for each batch of queries, sending the batch of queries to a partition matching the partition identifier.

10. The system of claim 9, wherein the partition identifier includes a partition key.

11. The system of claim 9, wherein the partition identifier is received from a server communication driver.

12. The system of claim 9, wherein the operation further comprises:
receiving, at the object relational mapper, an additional database query from the user, wherein the additional database query includes an additional plurality of search parameters;
parsing the schema for the plurality of database tables to identify a table with a respective primary key including a highest number of search fields;
executing a given query in the table using search parameters of the additional plurality of search parameters matching the respective primary key;
receiving a result list from the table;
filtering the result list using the search parameters of the additional plurality of search parameters not matching the respective primary key of the table to produce a filtered result list; and
providing the filtered result list to the user.

13. The system of claim 12, wherein the operation further comprises:
receiving, at the object relational mapper, a second database query including a second search parameter from the user;
generating a second result list by filtering the filtered result list using the second search parameter; and
providing the second result list to the user.

14. The system of claim 8, wherein the operation further comprises:
receiving, at the object relational mapper, a request to update a field in a non-relational database with a value;
parsing the schema for the plurality of database tables to identify one or more tables that include the field; and
generating a database command for each identified database table, wherein the database command writes the value to the field; and
sending each database command to the identified database table.

15. A method for using object-relational mappings for data in non-relational databases comprising:
receiving, at an object relational mapper, a database query from a user, wherein the database query includes a plurality of search parameters;
parsing a schema for a plurality of database tables to identify a table with a primary key including a highest number of search fields;
executing a query in the table using the search parameters matching the primary key;
receiving a result list from the table;
filtering the result list using the search parameters of the plurality of search parameters not matching the primary key of the table to produce a filtered result list; and
providing the filtered result list to the user.

16. The method of claim 15, further comprising:
receiving, at the object relational mapper, a group of database queries from the user, wherein each database query includes a partition identifier;

sorting the database queries in the group of database queries into a plurality of batches; wherein the database queries in each batch include a same partition identifier; and for each batch of queries, sending the batch of queries to a partition matching the partition identifier.

17. The method of claim 16, wherein the partition identifier includes a partition key.

18. The method of claim 16, wherein the partition identifier is received from a server communication driver.

19. The method of claim 15, further comprising:

receiving, at the object relational mapper, an additional database query from the user, wherein the additional database query includes an additional plurality of search parameters;

parsing the schema for the plurality of database tables to identify a respective table with a respective primary key including a respective highest number of search fields;

executing a given query in the respective table using search parameters of the additional plurality of search parameters matching the respective primary key;

receiving a respective result list from the respective table;

filtering the result list using the search parameters of the additional plurality of search parameters not matching the respective primary key of the table to produce a respective filtered result list; and providing the respective filtered result list to the user.

20. The method of claim 19, further comprising:

receiving, at the object relational mapper, a second database query including a second search parameter from the user;

generating a second result list by filtering the filtered result list using the second search parameter; and providing the second result list to the user.

* * * * *